C. M. SUTER.
Binders' Attachments for Harvesters.
No. 156,390. Patented Oct. 27, 1874.
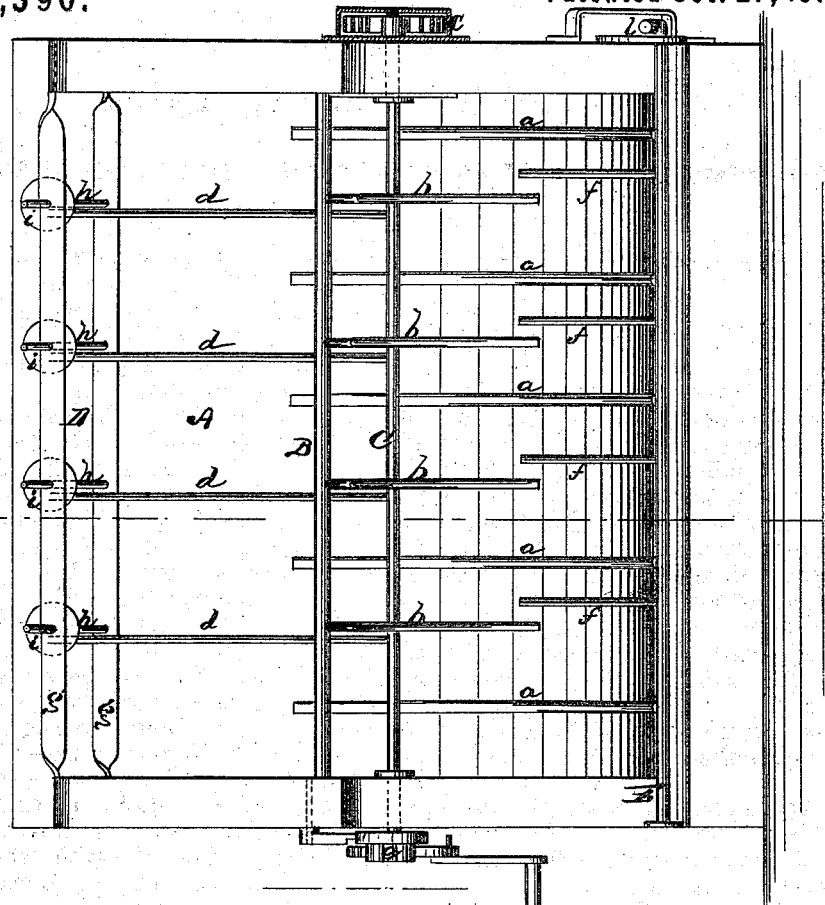
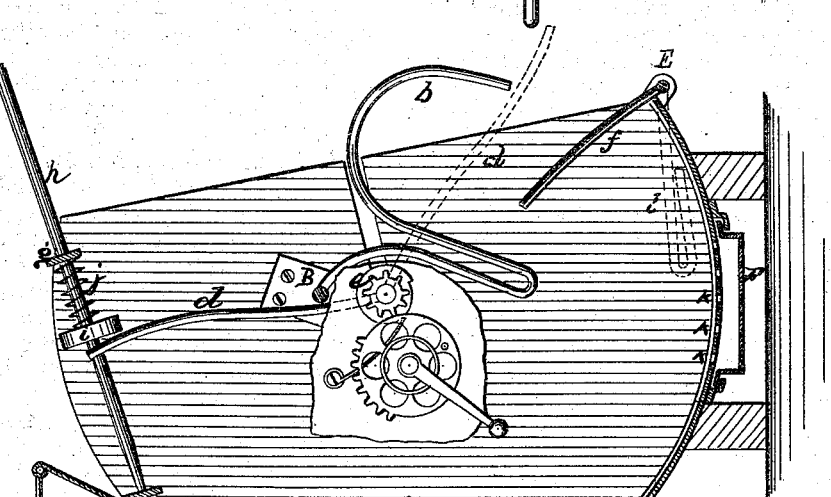
Witnesses:
Inventor:
Cyrus M. Suter

UNITED STATES PATENT OFFICE.

CYRUS M. SUTER, OF ASHTON, ILLINOIS.

IMPROVEMENT IN BINDERS' ATTACHMENTS FOR HARVESTERS.

Specification forming part of Letters Patent No. 156,390, dated October 27, 1874; application filed August 17, 1874.

*To all whom it may concern:*

Be it known that I, CYRUS M. SUTER, of Ashton, in the county of Lee and State of Illinois, have invented a new and useful Improvement in Binders' Attachments for Harvesters; and that the following is a full, clear, and exact description of the same, reference being had to the accompanying drawings, and to the letters of reference marked thereon, making a part of this specification.

The invention consists of a semicircular box, having fitted therein a series of fixed, movable, and oscillating tines, whereby the cut grain at the proper time is allowed to enter, and is gathered up and held firmly for binding, and, when bound, is finally delivered.

In the accompanying sheet of drawings, Figure 1 is a plan view of my improved binder's attachment; and Fig. 2 an end view of same, partly in section.

Similar letters of reference indicate like parts in the several figures.

A represents a semi-cylindrical case, which may be constructed of any suitable material. Within the case A, at suitable distances, are secured a series of ribs, $a$, and within the case, near its upper side, is fixed a shaft, B, to which are secured a series of double curved tines, $b$. Immediately below the shaft B, and passing axially through the case A, is a shaft, C, oscillating in suitable bearings. This last-mentioned shaft has affixed to it a series of tines, $d$, and at one of its ends a spring, $c$, or other similar device, and to its other end a pinion, $e$. At or near the under side of the case A is secured an oscillating shaft, E, having affixed to it a series of tines, $f$. To the upper side of the case A are secured two bearing-bars, $g$ $g$, through which passes a series of tines, $h$. These tines have attached to them disks $i$ and coiled springs $j$. The upper curved side of the case A is flared into a mouth, D. Through the bottom of the case A are a series of perforations, $k$ $k$, and under these perforations is a sliding box or receptacle, F.

My binders' attachment being constructed substantially as above described, it is operated by attaching it to a harvester, so that the endless apron or carrier of the harvester will deliver the cut grain into the flare or mouth D of the case A.

When the shaft C is made to revolve by any suitable means—gear-wheels, or otherwise—the tines $d$ collect the straw or grain, and, as the shaft revolves, said tines, being carried around, follow the curve of the case A, carrying around with them the cut grain or straw before mentioned by a quick motion, and confine it against the double curved tines $b$, where it is securely held until bound in any suitable manner by the attendants, the tines $f$ preventing the straw from falling out until it has passed them, when they drop below the tied bundle or sheaf, and allow it to slide over them outward. This motion is imparted to the tines $f$ by a lever, $l$, provided with a counter-weight or other similar device.

When the tines $d$ are moved forward, carrying before them the grain which has fallen into the case A, as above described, the tines $h$ are forced downward by the action of the springs $j$ through the bearing-bars $g$, and across the flare or mouth D, preventing the admission of any further straw until that which has already been admitted has been bound.

When the tines $d$ are released from holding the straw in position for binding, they are thrown back by the action of the spring $c$ at the end of the shaft C, and said tines, coming in contact with the disks $i$ on the tines $h$, raise these tines, so that they clear the flare or mouth D, and leave it unobstructed for the admission of straw to be again bound, and so on, from time to time, as long as the machine is in operation.

In order to catch and preserve any loose grain or other seeds that may become detached from the straw as it is carried into the case A, a series of perforations, $k$, are formed in the bottom of the case, through which the grain or seeds fall into a receptacle, F.

The ribs $a$ act as slideways to facilitate the movement of the straw into the case A.

The gear-wheel which works into the pinion $e$ of the shaft C has gears formed on one of its sides only, so that, when the teeth of said wheel are out of contact with the pinion $e$, spring $c$ acts to throw the tines backward again to their original position.

Having thus described my invention, what I claim as new, and desire to secure by Letters Patent, is—

1. The combination, with oscillating tines $d$, of a spring, $c$, arranged in connection with the gearing, so as to retract the tines when the gavel is bound, substantially as described.

2. The combination of the tines $h$ and oscillating tines $d$, operating together to open and close the mouth of the casing, substantially as described, for the purpose specified.

3. In a binders' attachment for harvesters, the combination of oscillating tines $d$, fixed tines $b$, tines $f$ and $h$, and spring $c$, substantially as and for the purpose described.

CYRUS M. SUTER.

Witnesses:
CLARENCE PENSE,
H. H. BLACK.